United States Patent
Bozio et al.

(10) Patent No.: US 10,328,881 B2
(45) Date of Patent: Jun. 25, 2019

(54) COMPONENT FOR VEHICLE INTERIOR

(71) Applicant: Shanghai Yanfeng Jinqiao Automotive Trim Systems Co. Ltd, Novi, MI (US)

(72) Inventors: Ronald A Bozio, Holland, MI (US); Javier Avila, Holland, MI (US)

(73) Assignee: Shanghai Yanfeng Jinqiao Automotive Trim Systems Co. Ltd, Novi, MI (US)

( * ) Notice: Subject to any disclaimer, the term of this patent is extended or adjusted under 35 U.S.C. 154(b) by 20 days.

(21) Appl. No.: 15/786,784

(22) Filed: Oct. 18, 2017

(65) Prior Publication Data

US 2018/0111578 A1  Apr. 26, 2018

Related U.S. Application Data

(60) Provisional application No. 62/413,307, filed on Oct. 26, 2016.

(51) Int. Cl.
  *B62C 99/00* (2009.01)
  *B60R 21/04* (2006.01)
  *B60N 2/75* (2018.01)

(52) U.S. Cl.
  CPC .......... *B60R 21/0428* (2013.01); *B60N 2/75* (2018.02)

(58) Field of Classification Search
  CPC ...................... B60R 21/0428; B60N 2/75
  See application file for complete search history.

(56) References Cited

U.S. PATENT DOCUMENTS

| 5,216,035 | A | | 6/1993 | Harrison et al. | |
|---|---|---|---|---|---|
| 5,389,693 | A | | 2/1995 | DeGenova et al. | |
| 5,445,430 | A | * | 8/1995 | Nichols | B60N 2/78 296/153 |
| 9,085,265 | B2 | | 7/2015 | Hipshier | |
| 2009/0256374 | A1 | * | 10/2009 | Augustyn | B60N 2/78 296/1.09 |
| 2009/0284041 | A1 | * | 11/2009 | Hall | B60J 5/0451 296/146.6 |
| 2009/0305000 | A1 | * | 12/2009 | Schoemann | B29C 45/1676 428/174 |
| 2012/0326461 | A1 | * | 12/2012 | Orlowsky | B60N 3/026 296/1.02 |
| 2016/0167550 | A1 | * | 6/2016 | Doan | B60N 2/427 297/411.21 |
| 2017/0232872 | A1 | * | 8/2017 | Faruque | B33Y 10/00 297/411.46 |

\* cited by examiner

*Primary Examiner* — Lori L Lyjak

(57) ABSTRACT

A component for a vehicle interior configured to deform under a load is disclosed. An armrest for a vehicle interior configured to deform under a load is disclosed. A method for forming the armrest is disclosed. The armrest may comprise a substrate and base formed on the substrate. The base may comprise a core and a surface (or skin). The core may comprise a material configured to deform under a load (e.g. impact). The method for forming the armrest may comprise the steps of: (a) placing the substrate in a mold and (b) forming the base on the substrate. A coating may be provided in the mold. The substrate may be formed from a plastic material such as a thermoplastic material to provide a structure. The base of the armrest may be formed from a plastic material such as a polyurethane foam material to form the core with integral surface/skin.

21 Claims, 7 Drawing Sheets

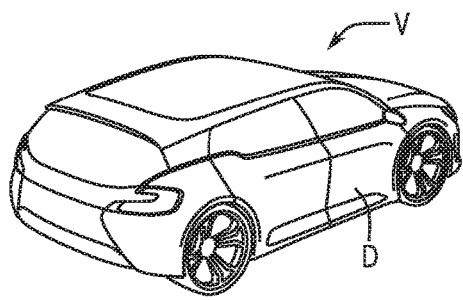
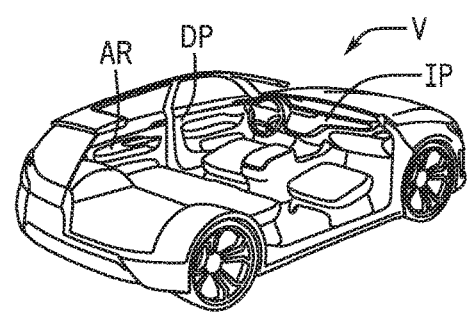
FIG. 1A    FIG. 1B
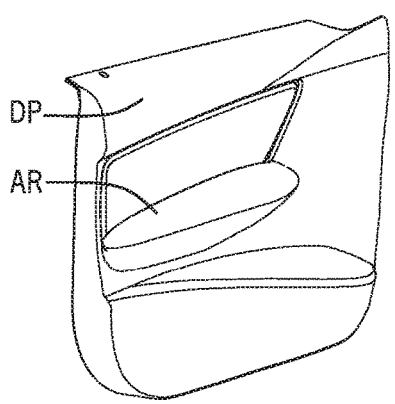
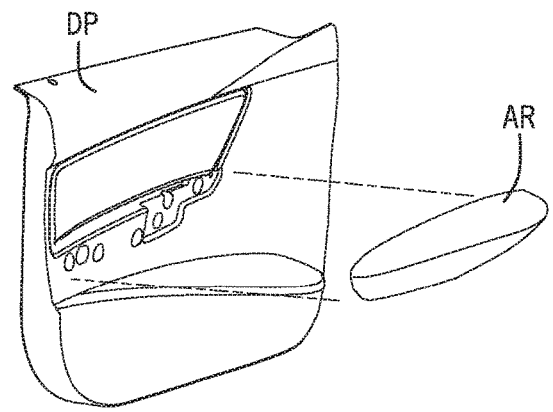
FIG. 2A    FIG. 2B
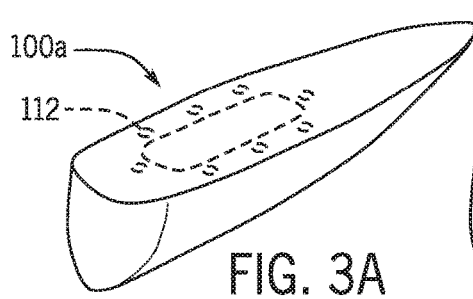
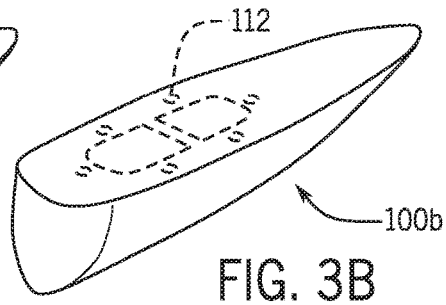
FIG. 3A    FIG. 3B
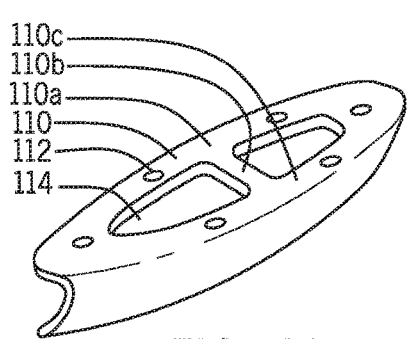
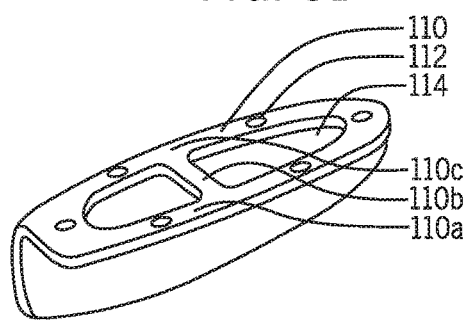
FIG. 4A    FIG. 4B

COMPONENT FOR VEHICLE INTERIOR

CROSS REFERENCE TO RELATED APPLICATIONS

The present application claims priority from and the benefit of and incorporates by reference in entirety U.S. Provisional Patent Application Ser. No. 62/413,307 entitled "COMPONENT FOR VEHICLE INTERIOR" filed Oct. 26, 2016

FIELD

The present invention relates to a component for vehicle interior. The present invention also relates to an armrest. The present invention also relates to a component for a vehicle interior configured to deform under a load. The present invention also relates to a method of producing a component for a vehicle interior with a substrate and base using a mold. The present invention also relates to a component for a vehicle interior configured to deform under a load and formed with a substrate and base using a mold by a process. The present invention also relates to an armrest for a vehicle interior configured to deform under a side impact load.

BACKGROUND

It is known to provide an armrest within a door assembly and/or within a side panel for a vehicle interior. It is also known for the armrest to provide cushioning to facilitate comfort for vehicle occupants. It is also known that an armrest can present a potential hazard during a side impact collision placed upon the vehicle. It is also known that the armrest can be forced further into the cabin area as a result of the impact. It is also known to provide an armrest with a crumple zone configured to deform and dissipate impact energy during a side impact collision placed upon the vehicle.

It would be advantageous to provide an improved component for a vehicle interior. It would also be advantageous to provide an improved armrest. It would also be advantageous to provide a component for a vehicle interior configured to deform under a load. It would also be advantageous to provide a method of producing a component for an improved vehicle interior with a substrate and base using a mold. It would also be advantageous to provide an improved component for a vehicle interior configured to deform under a load and formed with a substrate and base using a mold by a process. It would also be advantageous to provide an improved armrest for a vehicle interior configured to deform under a side impact load.

SUMMARY

The present invention relates to an armrest for a vehicle comprising a laterally collapsible structure providing at least one gap defined between an inner portion and an outer portion; and a base formed on the collapsible substrate configured to facilitate deflection or deformation of the inner portion of the substrate relative to the outer portion of the substrate to deflect in response to lateral load on the collapsible substrate. The base may be formed of a material. The base may comprise a core comprised of core material and a surface formed on the core comprised of surface material. The inner portion and the outer portion of the substrate may provide features for flow of the material of the base to register the base to the substrate. The base may be overmolded onto the collapsible substrate. The base may include a support that comprises fill into at least one aperture of the substrate. The substrate may comprise at least one spanning support that at least partially defines a buckling feature of the substrate and base. The surface may comprise the material of the core. The density of the surface material may be greater than the density of the core material. The material of the base may comprise at least one of (a) a mixture of polyurethane, (b) a combination of a reaction mixture, (c) foam material, (d) polyurethane foam, (e) urethane foam, (f) injection-molded material, (g) injected foam material, (h) plastic, (i) resin. The surface may be formed as a skin on the core. The material of the base may comprise at least one of (a) a foam material, (b) a urethane foam, (c) a compressible foam. The base may comprise a cushion formed on the substrate from an injection-molded material. The injection-molded material may form the core. The base may be formed to at least partially entrap the substrate. The collapsible structure may be configured for attachment to a door panel. The core may be configured to deform under at least one of (a) an impact load, (b) a side impact load, (c) a collision impact.

The present invention also relates to an armrest for a vehicle comprising a substrate having a top portion and a side portion; a base providing a reinforcement formed over the substrate and providing a lateral support for the top portion of the substrate; and a cover over the base. The base may be formed of a material that forms an integral skin on a core. The base may comprise a unitary member. The material forming the base may comprise at least one of (a) a mixture of polyurethane, (b) a combination of a reaction mixture, (c) foam material, (d) polyurethane foam, (e) urethane foam, (f) injection-molded material, (g) injected foam material, (h) plastic, (i) resin. The base may be overmolded onto at least one of (a) the top substrate portion, (b) the side substrate portion. The armrest substrate may include an attachment feature for a frame of a vehicle door. The armrest substrate may include a plurality of crumple portions.

The present invention also relates to an armrest for a vehicle interior comprising a substrate; and a base spanning over a gap in the substrate. The base may be formed from a material and may comprise a core and a surface. The density of the material of the surface may be greater than the density of the material of the core. The material may comprise at least one of (a) a mixture of polyurethane, (b) a combination of a reaction mixture, (c) foam material, (d) polyurethane foam, (e) urethane foam, (f) injection-molded material, (g) injected foam material, (h) plastic, (i) resin.

The present invention also relates to a component for a vehicle interior configured to deform under a load. The component may comprise a substrate providing a structure and a base formed on the substrate. The base may comprise a core and a surface; the core may comprise a material configured to deform under load.

The present invention also relates to a method of producing a component for a vehicle interior with a substrate and base using a mold. The method may comprise the steps of placing the substrate in the mold and forming the base on the substrate. The base may be formed from a material provided into the mold.

The present invention also relates to a component for a vehicle interior configured to deform under a load and formed with a substrate and base using a mold by a process. The process may comprise the steps of placing the substrate in the mold and forming the base on the substrate from a material. The material may comprise a liquid material forming a core and a surface on the core.

The present invention also relates to an armrest for a vehicle interior configured to deform under a lateral impact load. The armrest may comprise a substrate providing a structure and a base formed on the substrate. The base may comprise a core and a surface; the core may comprise a material forming the surface and the core and configured to compress under load.

The present invention also relates to an improved armrest for a vehicle. The armrest may comprise a laterally collapsible structure providing at least one gap defined between an inner portion and an outer portion and a base formed on the collapsible substrate configured to facilitate deflection or deformation of the inner portion of the substrate relative to the outer portion of the substrate to deflect in response to lateral load on the collapsible substrate. The base may comprise a core and a surface formed on the core.

The present invention also relates to an improved vehicle armrest. The armrest may comprise a substrate having a top portion and a side portion, a base providing a reinforcement formed over the substrate and providing a lateral support for the top portion of the substrate and a cover over the base. The base may be formed of a material that forms an integral skin on a core.

The present invention also relates to an improved armrest. The armrest may comprise a substrate, a base spanning over a gap in the substrate and a cover extending over the base. The base may comprise a core and a surface. The density of the material of the surface may be greater than the density of the material of the core. The material may comprise at least one mixture of polyurethane, combination of a reaction mixture, foam material, polyurethane foam, urethane foam, injection-molded material, injected foam material, plastic and/or resin. The cover may comprise at least one of fabric, textile, leather, vinyl, plastic, material skin and/or foam. The surface may be formed on the core; the surface may comprise the material of the core; the surface may comprise a skin; the surface may comprise a cover. The density of the material of the surface may be greater than the density of the material of the core. The material may comprise at least one mixture of polyurethane, combination of a reaction mixture, foam material, polyurethane foam, urethane foam, injection-molded material, injected foam material, plastic, or resin. The surface may be formed as a skin on the core. The cover may comprise at least one of coating, paint, finish, fabric, textile, leather, vinyl, plastic, the material, skin, foam. The cover may further comprise a coating on the surface; the coating may comprise a cover. The base may comprise an armrest; the base may comprise a foam pad; the base may comprise a cushion. The material may comprise a compressible foam. The base may be formed on the substrate from an injection-molded material. The injection-molded material may form the core; the injection-molded material may form the surface on the core. The base may be formed to at least partially entrap the substrate. The core of the base may at least partially entrap the substrate; the substrate may comprise a panel. The structure may comprise a panel. The core of the base may be formed on the structural panel. The core may further comprise a cover on the surface. The substrate may comprise a set of features configured to register the base with the substrate; the set of features may comprise a set of holes in the substrate. The material of the base may flow into the set of holes when the base is formed on the substrate. The interior component may comprise an armrest. The interior component may comprise an armrest for a door; the interior component may comprise an armrest attachable to a door panel. The core may be configured to compress under load. The core may be configured to deform under an impact load. The core may be configured to deform under a side impact load. The core may be configured to deform under a collision impact.

FIGURES

FIG. 1A is a schematic perspective view of a vehicle according to an exemplary embodiment.

FIG. 1B is a schematic perspective view of the vehicle showing a vehicle interior according to an exemplary embodiment.

FIG. 2A is a schematic perspective view of a door panel according to an exemplary embodiment.

FIG. 2B is a schematic exploded view of the door panel according to an exemplary embodiment.

FIGS. 3A and 3B are schematic perspective views of a component for a vehicle interior according to an exemplary embodiment.

FIGS. 4A and 4B are schematic perspective views of a substrate for a component for a vehicle interior according to an exemplary embodiment.

DESCRIPTION

Figure 5A:
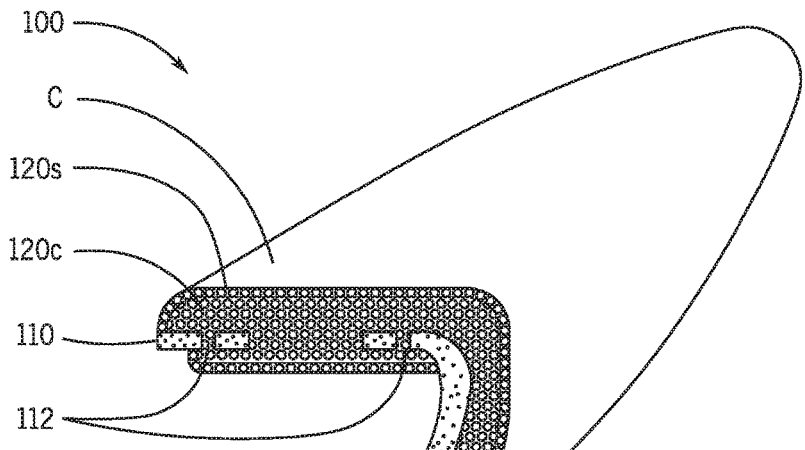
FIG. 5A is a schematic perspective cross-section view of a component for a vehicle interior according to an exemplary embodiment.

Referring to FIGS. 1A and 1B, a vehicle V is shown including an interior with doors and an instrument panel IP according to an exemplary embodiment. As shown schematically in FIGS. 1B, 2A and 2B, a door D can provide a door panel DP or side panel for the vehicle interior; door panel DP provides an armrest AR. According to an exemplary embodiment, armrest AR may be configured to facilitate comfort for vehicle occupants.

As shown schematically in FIGS. 3A and 3B, an armrest 100a and an armrest 100b are shown according to an exemplary embodiment. Armrest 100a and/or armrest 100b may be attached (e.g. fastened, etc.) to a door panel. According to an exemplary embodiment (as shown schematically in FIGS. 3A-3B, 5A-5B, 7A-7D and 9A-9B), a substrate 110 of an armrest 100a or 100b may comprise at least one gap 114 and/or at least one hole or aperture 112 (see e.g. FIGS. 4A and 4B); armrest 100a or 100b may be configured to collapse, deform or crumple when the vehicle is impacted in a side collision (see e.g. FIGS. 7C and 7D).

As shown schematically in FIGS. 4A and 4B, a substrate or structure 110 provides at least one gap or opening 114 and at least one hole or aperture 112. Substrate or structure 110 may provide a plurality of crumple portions such as an outer portion 110c and a spanning support 110b between an inner portion 110a and outer portion 110c. See also FIGS. 7A-7D (showing crumple portions in operation schematically according to an exemplary embodiment). According to an exemplary embodiment, substrate or structure 110 provides structural support for armrest 100a or 100b and for an arm of a vehicle occupant. According to an exemplary embodiment, substrate or structure 110 may be molded from a plastic material. According to an exemplary embodiment, substrate or structure 110 may be configured (e.g. molded with a predetermined stiffness) to collapse or deform (e.g. crumple) under a predetermined lateral load to dissipate the energy from the impact of a vehicle side collision. According to an exemplary embodiment, substrate or structure 110 may comprise an inner portion 110a, an outer portion 110c and a spanning support 110b between inner portion 110a and outer portion 110c that may partially define a buckling or collapsing feature of the substrate and base. Inner portion 110a and outer portion 110c may provide features such as hole or aperture 112 and/or gap or opening 114 for flow of a material of a base 120 (see FIG. 5B) to register base 120 to substrate or structure 110. Substrate or structure 110 may be configured for attachment to a door panel and base 120 may be configured to deform under at least one of (a) an impact load, (b) a side impact load, (c) a collision impact.

Figure 5B:
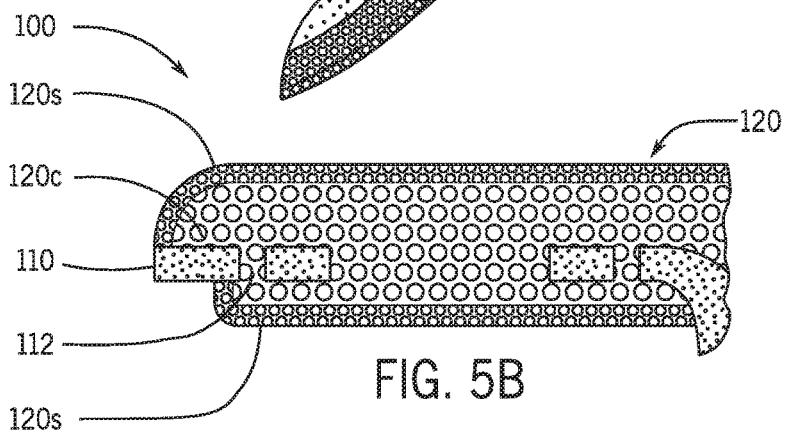
FIG. 5B is a schematic cross-section partial view of the component for a vehicle interior according to an exemplary embodiment.

As shown schematically in FIGS. 5A and 5B, an armrest 100 may comprise a substrate or structure 110 and a base 120; base 120 may comprise a skin 120s and a core 120c. According to an exemplary embodiment, substrate or structure 110 may be made from a plastic material such as a thermoplastic/foam material; substrate or structure 110 may be configured to provide structural support for armrest 100; substrate or structure 110 may be configured to collapse or deform (e.g. crumple) under a predetermined load (e.g. during a side collision). According to an exemplary embodiment, skin 120s and core 120c may be made from a polyurethane foam; skin 120s may have a higher density than core 120c. According to an exemplary embodiment, core 120c may span over a gap in substrate or structure 110.

According to an exemplary embodiment, armrest 100 may provide a cover C for skin 120s; cover C may be a layer of coating on skin 120s according to an exemplary embodiment. As shown schematically in FIGS. 5A-5B, a material of the base may comprise a core and a surface or skin; as shown schematically in FIGS. 5A-5B the core 120c of the base forms on and into/around the substrate/structure {e.g. including through hole(s) 112 and gap(s) 114} to register/secure base 120 to structure or substrate 110. Base 120 may include a support that comprises fill into at least one aperture 112 of substrate 110. See also FIGS. 7A-7D, 8A-8G and 9A-9B.

Figure 6A:
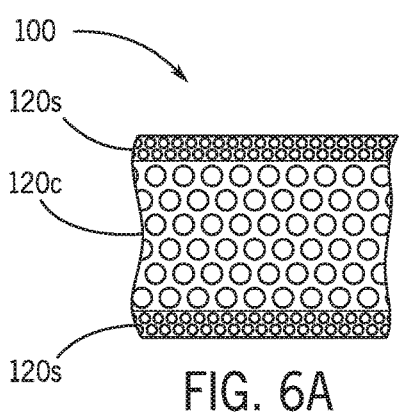
FIG. 6A is a schematic cross-section detail view of the component for a vehicle interior according to an exemplary embodiment.

As shown schematically in FIG. 6A, base 120 may comprise skin 120s and core 120c. According to an exemplary embodiment, skin 120s and core 120c may be made from a (a) a mixture of polyurethane, (b) a combination of a reaction mixture, (c) foam material, (d) polyurethane foam, (e) urethane foam, (f) injection-molded material, (g) injected foam material, (h) plastic, (i) resin; skin 120s may have a higher density than core 120c. According to an exemplary embodiment as shown schematically, skin/surface 120s may be formed integrally with core of the base. See e.g. FIGS. 5A-5B, 6A-6B and 8A-8G.

Figure 6B:
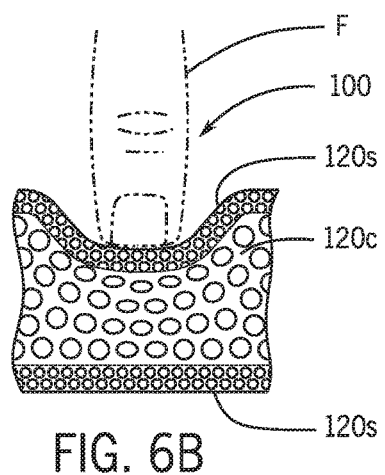
FIG. 6B is a schematic cross-section detail view of the component for a vehicle interior being compressed according to an exemplary embodiment.

As shown schematically in FIGS. 6A and 6B, material of core 120c of base 120 may compress under a load (e.g. shown as applied by a finger F); base 120 may be configured to facilitate comfort for vehicle occupants according to an exemplary embodiment.

Figure 7A:
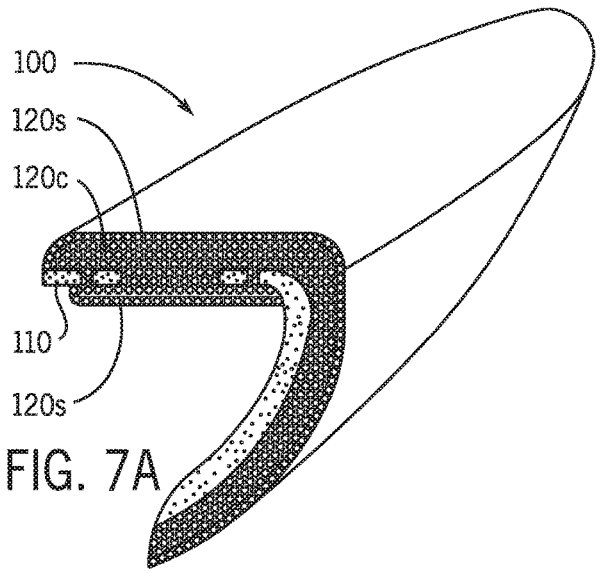
FIG. 7A is a schematic perspective cross-section view of a component for a vehicle interior according to an exemplary embodiment.
Figure 7B:
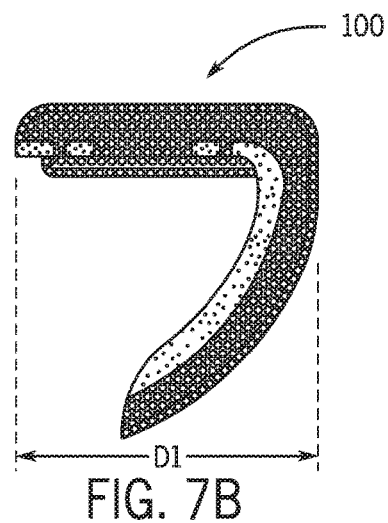
FIG. 7B is a schematic cross-section view of the component for a vehicle interior according to an exemplary embodiment.

As shown schematically in FIGS. 7A and 7B, armrest 100 may comprise a substrate or structure 110 and a base that may comprise a skin 120s and a core 120c. According to an exemplary embodiment, substrate or structure 110 may be made from a plastic material such as a thermoplastic material; substrate or structure 110 may be configured to provide structural support for armrest 100; substrate or structure 110 may be configured to deform (e.g. crumple) under a predetermined load (e.g. during a side collision see e.g. FIGS. 7C and 7D). According to an exemplary embodiment, skin 120s and core 120c may be made from a polyurethane foam; skin 120s may have a higher density than the foam core 120c. As shown schematically in FIG. 7B, armrest 100 may comprise an undeflected width D1.

Figure 7C:
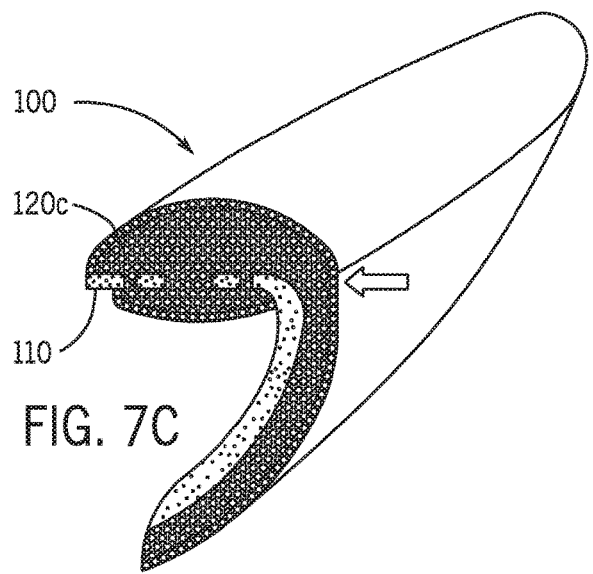
FIG. 7C is a schematic perspective cross-section view of the component for a vehicle interior during a side collision according to an exemplary embodiment.
Figure 7D:
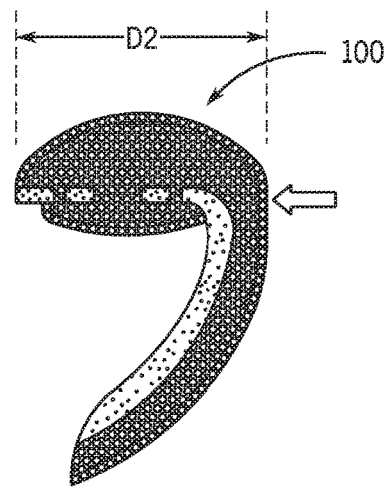
FIG. 7D is a schematic cross-section view of the component for a vehicle interior during a side collision according to an exemplary embodiment.

As shown schematically in FIGS. 7C and 7D, armrest 100 may be configured to deform (e.g. crumple) under a predetermined load (e.g. during a side impact/collision). See also FIGS. 4A-4B (showing crumple portions comprising inner portion 110a and support 110b and outer portion 110c according to an exemplary embodiment). According to an exemplary embodiment, armrest 100 is intended to collapse or crumple during a side collision to dissipate the energy from the side impact; armrest 100 is intended to provide enhanced protection for vehicle occupants during a side collision. As shown schematically in FIG. 7D, armrest 100 may comprise a deflected width D2 less than D1 after collapsing or deforming.

Figure 8A:
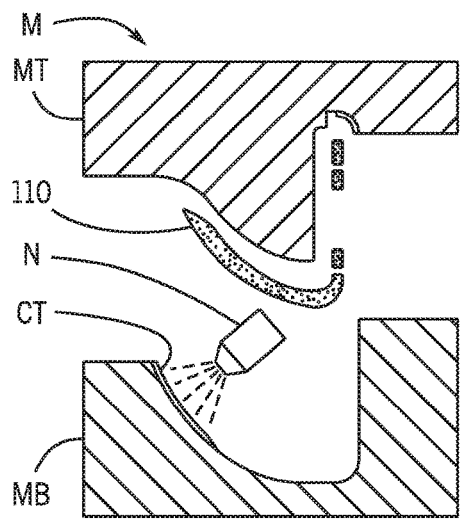
FIGS. 8A to 8F are schematic cross-section views of a process for forming a component for a vehicle interior according to an exemplary embodiment.

As shown schematically in FIG. 8A, a mold M may comprise a mold top MT and a mold bottom MB. According to an exemplary embodiment, mold top MT is the core half of the mold M; mold bottom MB is the cavity half of the mold M. As shown schematically in FIG. 8A, substrate or structure 110 is provided in mold M on the core half of mold M (i.e. mold top MT); a nozzle N is shown schematically spraying a layer of coating CT on the inner surface of the mold top MT and mold bottom MB.

Figure 8B:
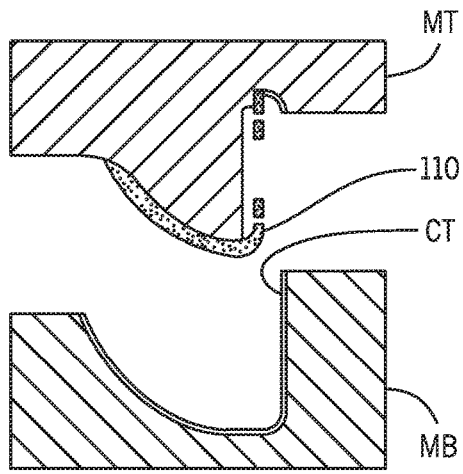

As shown schematically in FIG. 8B, substrate or structure 110 is provided on the core half of mold M (i.e. mold top MT); a layer of coating CT has been deposited (e.g. sprayed, etc.) on the inner surface of the mold top MT and mold bottom MB. According to an exemplary embodiment, coating CT may be configured to react and activate a polyurethane foam material within mold M during the molding process.

Figure 8C:
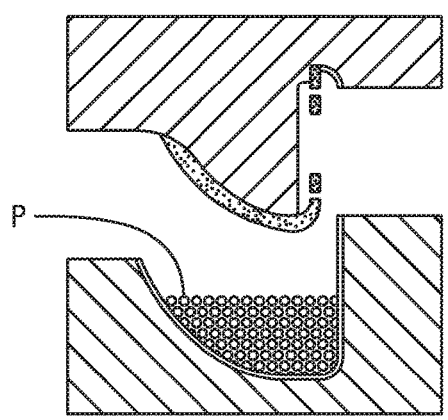

As shown schematically in FIG. 8C, a plastic material P such as a polyurethane foam material is injected into the mold cavity.

Figure 8D:
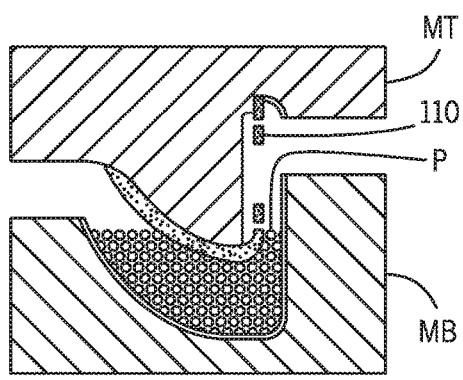

As shown schematically in FIG. 8D, mold top MT moves towards mold bottom MB to close mold M.

Figure 8E:
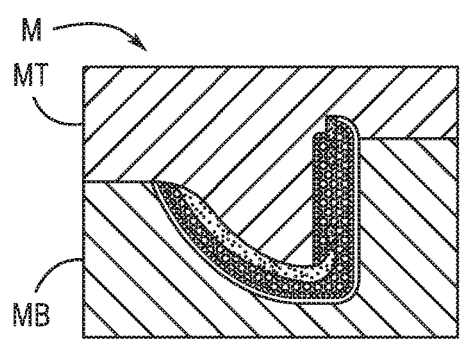

As shown schematically in FIG. 8E, mold M is at a closed position; material P is compressed inside of the mold cavity to form the shape of armrest 100. According to an exemplary embodiment, material P fills into at least one hole, gap or aperture of the substrate.

Figure 8F:
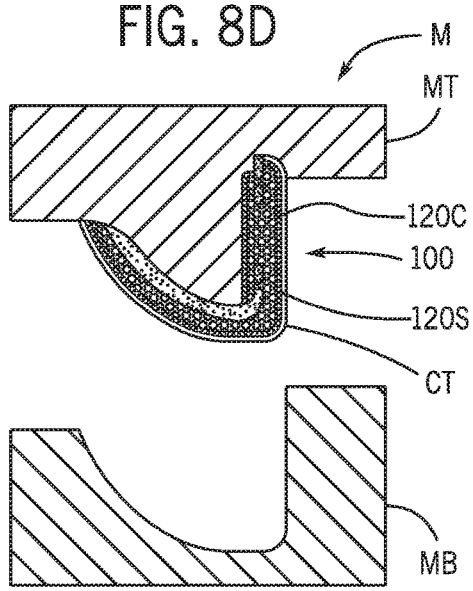

As shown schematically in FIG. 8F, after material P is formed (e.g. at least partially solidified, curved, etc.) mold M is opened; armrest 100 is formed (e.g. produced as a formed component with substrate and base formed with core 120c and skin 120s and optional coating CT). According to an exemplary embodiment, skin or surface 120s may comprise material of core 120c. A density of the material of the skin or surface 120s may be greater than a density of the material of the core 120c. According to an exemplary embodiment, base 120 formed with core 120c and skin 120s may be overmolded onto substrate 110. See also FIG. 8G. According to an exemplary embodiment, base 120 formed with core 120c and skin 120s may include at least one support comprising fill into at least one hole, gap or aperture of the substrate. See also FIG. 8G.

Figure 8G:
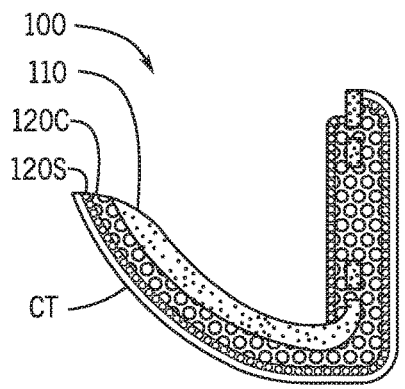
FIG. 8G is a schematic cross-section view of a component for a vehicle interior formed by a process according to an exemplary embodiment.
Figure 9A:
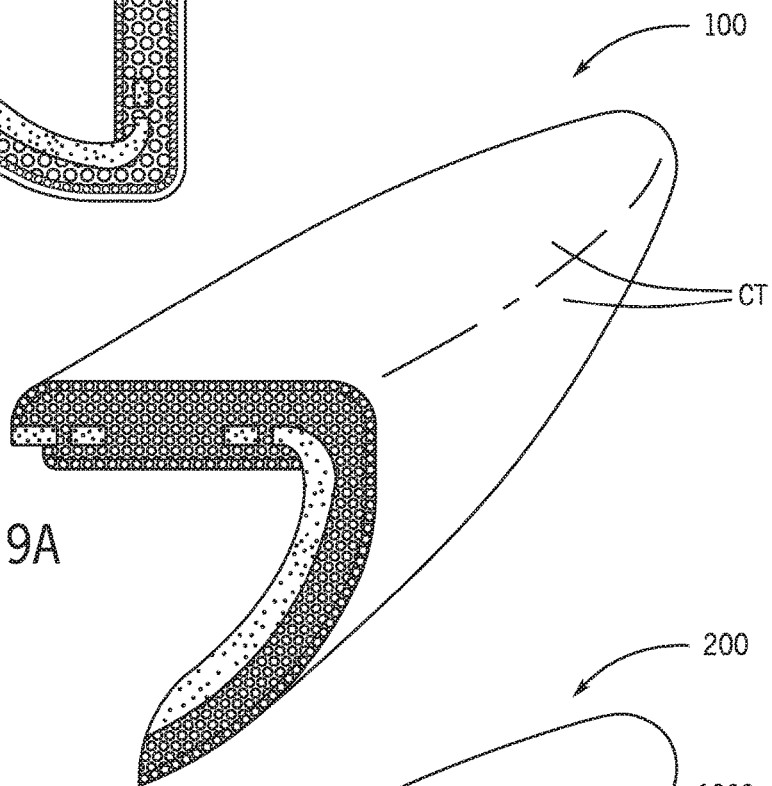
FIG. 9A is a schematic perspective cross-section view of a component for a vehicle interior according to an exemplary embodiment.

As shown schematically in FIGS. 8F, 8G and 9A, armrest 100 may comprise a substrate or structure 110, a core made from plastic material P, a surface of skin layer 120s and a coating CT on skin layer 120s. Substrate or structure 110 may be entrapped, fully covered or overmolded by skin layer 120s to cover substrate or structure 110 and prevent a vehicle occupant for seeing substrate or structure 110 when installed in a vehicle interior.

Figure 9B:
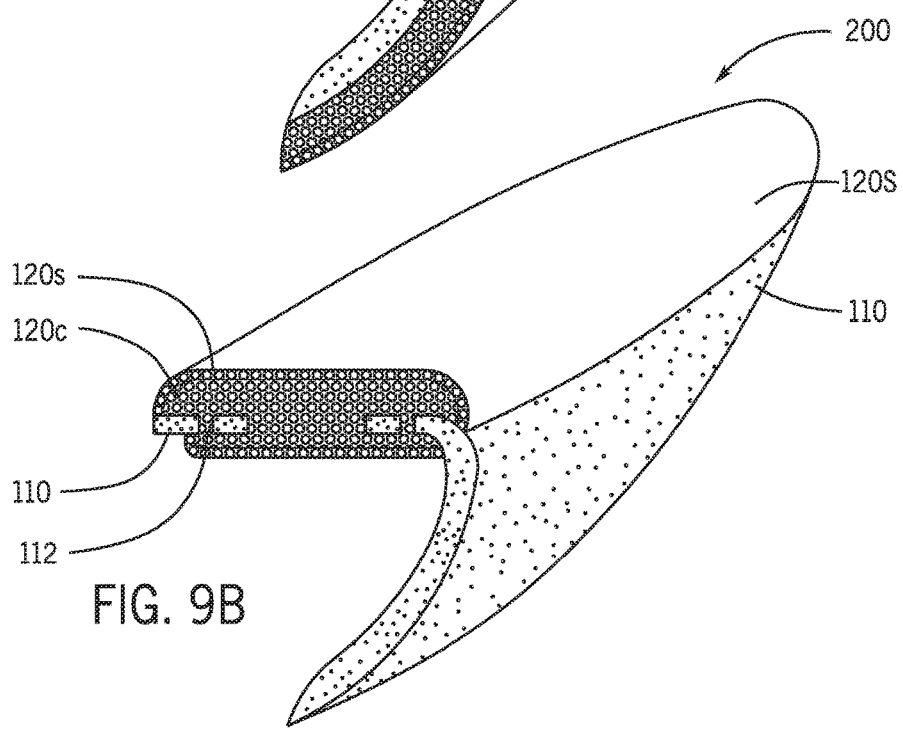
FIG. 9B is a schematic perspective cross-section view of a component for a vehicle interior according to an exemplary embodiment.

As shown schematically in FIG. 9B, according to an exemplary embodiment, an armrest 200 may comprise substrate or structure 110 and a base that may comprise a skin 120s and a core 120c. According to an exemplary embodiment, substrate or structure 110 may be made from a plastic material such as a thermoplastic material; substrate or structure 110 may be configured to provide structural support for armrest 100; substrate or structure 110 may be configured to deform (e.g. crumple) under a predetermined load (e.g. during a side collision). According to an exemplary embodiment, skin 120s and core 120c may be made from a polyurethane foam; skin 120s may have a higher density than the foam core 120c. According to an exemplary embodiment, armrest 200 may provide base 120 to facilitate comfort for vehicle occupants in the vertical direction; base 120 may cover a selective area of substrate 110 shown as a top portion of structure 110 according to the need for a particular vehicle design for practical reasons and/or aesthetic reasons. Substrate or structure 110 may be only partially covered by skin 120s allowing a vehicle occupant to see a portion of substrate or structure 110 shown as a side portion of structure 110 when installed in a vehicle interior. Base 120 may comprise a unitary member. Base 120 may be overmolded onto at least one of the top substrate portion and the side substrate portion.

Figures 10A, 10B, 10C:
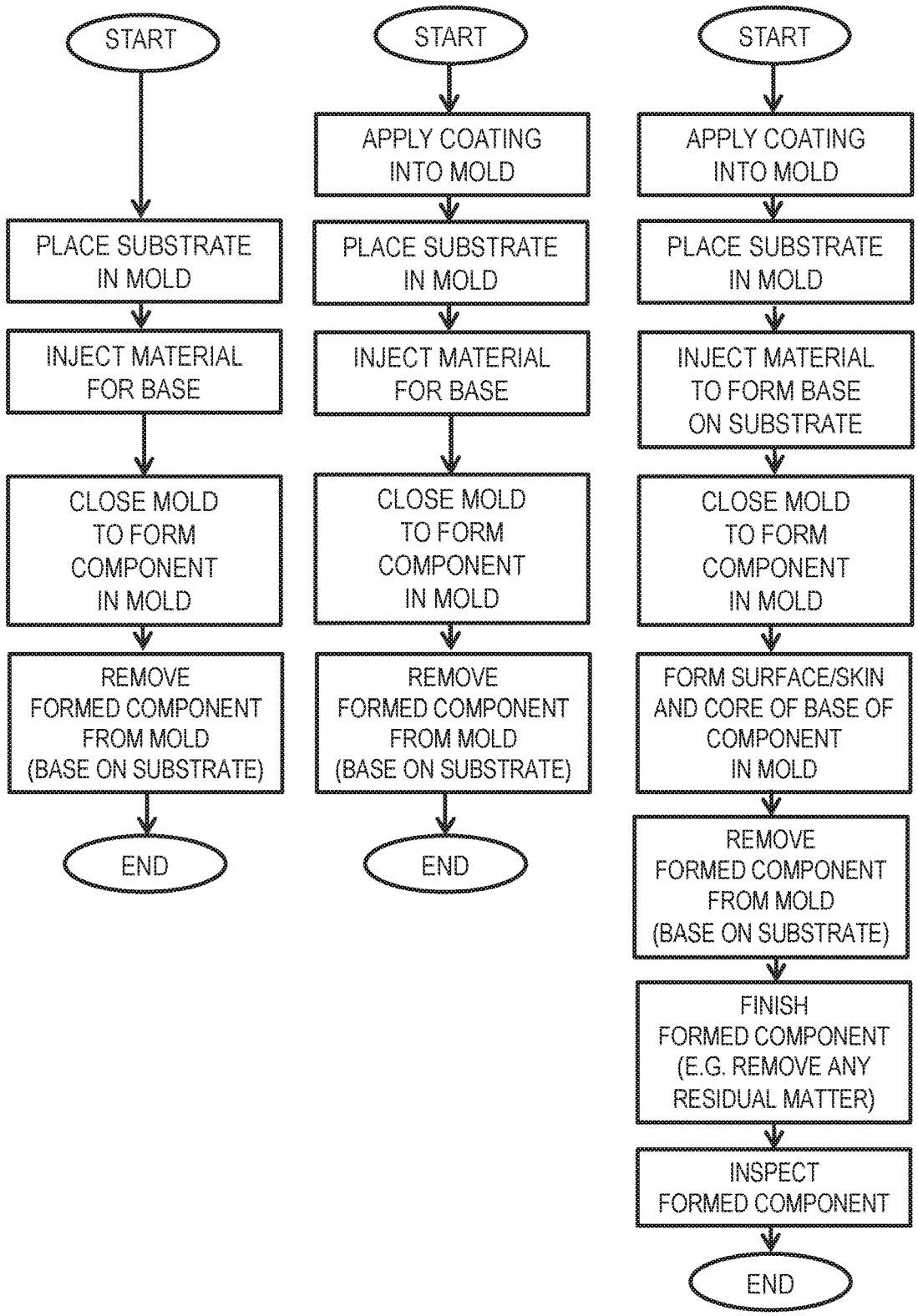
FIGS. 10A to 10C are schematic flow diagrams of a method to produce a component for a vehicle interior according to an exemplary embodiment.

As shown schematically in FIG. 10A according to an exemplary embodiment, a method for forming a vehicle interior trim component such as an armrest may comprise the steps of: (1) place substrate in mold; (2) inject material for base; (3) close mold to form component in mold; (4) remove formed component from mold (base on substrate).

As shown schematically in FIG. 10B according to an exemplary embodiment, a method for forming a vehicle interior trim component such as an armrest may comprise the steps of: (1) apply coating into mold; (2) place substrate in mold; (3) inject material for base; (4) close mold to form component in mold; (5) remove formed component from mold (base on substrate).

As shown schematically in FIG. 10C according to an exemplary embodiment, a method for forming a vehicle interior trim component such as an armrest may comprise the steps of: (1) apply coating into mold; (2) place substrate in mold; (3) inject material to form base on substrate; (4) close mold to form component in mold; (5) form surface/skin and core of base of component in mold; (6) remove formed component from mold (base on substrate); (7) finish formed component (e.g. remove any residual matter); (8) inspect formed component.

According to an exemplary embodiment, the formed component (e.g. such as an armrest) may be configured for attachment in a vehicle interior (e.g. attachment to a door/door panel as shown in FIGS. 2A-2B).

According to an exemplary embodiment, vehicles may contain various styles of components such as armrest assemblies, consoles, panels, etc.; such components may provide features such as additional cushioning and handles, storage compartments and/or cup holders, etc.

According to an exemplary embodiment, an armrest or support may be configured as an armrest to withstand the weight of a vehicle occupant arm (e.g. when attached to or in a vehicle such as to a door/door panel see e.g. FIGS. 2A-2B). According to an exemplary embodiment, a support (e.g. substrate, structure, etc.) for a vehicle interior component can be made of various materials (e.g. polypropylene, unfilled polypropylene, various other polymers, rubber, plastic, vinyl, foam, urethane, wire mesh, fabric, structural tape, ribbon, and other various elastic or plastic member, etc.).

Figures 11A, 11B:
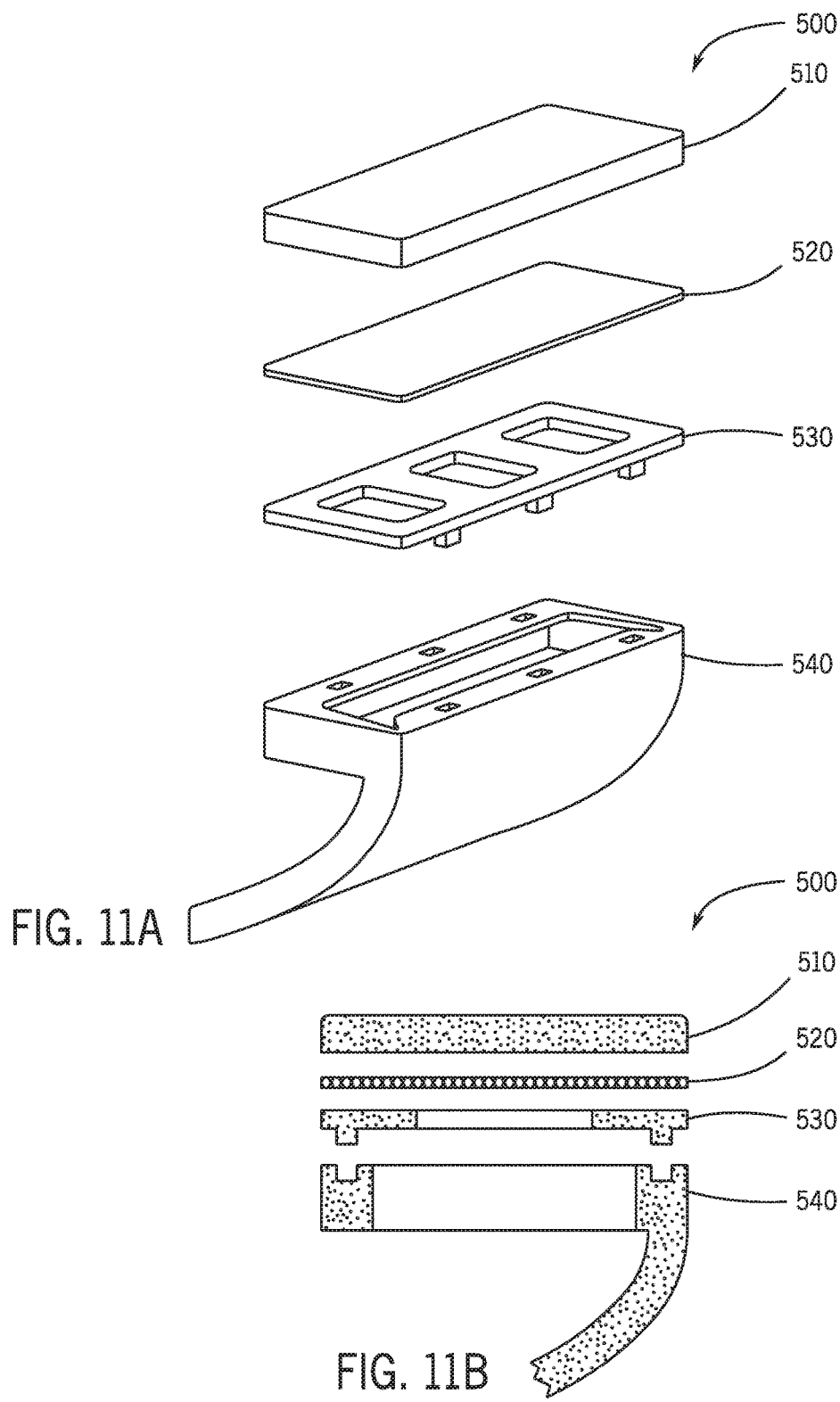
FIG. 11A is a schematic exploded perspective view of an armrest for a vehicle interior according to an exemplary embodiment.
FIG. 11B is a schematic cross-section exploded view of an armrest according to an exemplary embodiment.

A generally conventional armrest intended to implement a collapsible armrest concept/arrangement may be configured as shown, for example, in U.S. Patent Application Publication No. 2016/0167550 titled "Energy Absorbing Collapsible Armrest with Tunable Stiffening Feature" (incorporated by reference) and FIGS. 11A and 11B. As shown schematically in FIGS. 11A and 11B, a conventional armrest 500 may comprise a cover 510, a support 520, a stiffening feature 530 and a substrate 540 with a gap or opening defined between inner and outer substrate portions; the stiffening feature 530 may provide lateral support to substrate 540 for inner and outer portions of substrate 540 to deflect/deform towards each other under a predetermined lateral load (e.g. during a side collision).

RELATED PATENT DOCUMENTS—INCORPORATION BY REFERENCE

The present application incorporates by reference U.S. Pat. No. 9,085,265 titled "Flexible Interior Trim Component having an Integral Skin Show Surface" which shows a process for forming a component of a type/arrangement as shown schematically in FIGS. 8A-8F. The present application incorporates by reference the following U.S. patent documents: (a) U.S. Patent Application Publication No. 2016/0167550 titled "Energy Absorbing Collapsible Armrest with Tunable Stiffening Feature" (e.g. indicating a collapsible armrest of a type/arrangement as shown schematically in FIGS. 11A and 11B); (b) U.S. Pat. No. 5,389,693 titled "Integral Skin Polyurethane Foams and Process for the Preparation Thereof" (e.g. indicating an integral skin polyurethane foam of a type/arrangement as shown schematically in FIGS. 5A-5B, 6A-6B, 7A-7D, 8C-8G and 9A-9B); (c) U.S. Pat. No. 5,216,035 titled "Water-Blown Polyurethane Integral Skin Foam" (e.g. indicating an integral skin polyurethane foam of a type/arrangement as shown schematically in FIGS. 5A-5B, 6A-6B, 7A-7D, 8C-8G and 9A-9B).

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. An armrest for a vehicle comprising:
(a) a laterally collapsible substrate providing at least one gap defined between an inner portion and an outer portion of the substrate; and
(b) a base formed on the collapsible substrate configured to facilitate deflection or deformation of the inner portion of the substrate relative to the outer portion of the substrate to deflect in response to lateral load on the collapsible substrate;
wherein the base is formed of a material;
wherein the base comprises a core comprised of core material and a surface formed on the core comprised of surface material; and
wherein a density of the surface material is greater than a density of the core material.

2. The armrest of claim 1 wherein the inner portion and the outer portion of the substrate provide features for flow of the material of the base to register the base to the substrate.

3. The armrest of claim 1 wherein the base is overmolded onto the collapsible substrate.

4. The armrest of claim 1 wherein the base comprises a support comprising fill into at least one aperture of the substrate.

5. The armrest of claim 1 wherein the substrate comprises at least one spanning support that at least partially defines a buckling feature of the substrate and base.

6. The armrest of claim 1 wherein the surface comprises the material of the core.

7. The armrest of claim 1 wherein the base is formed from the material as a unitary member comprising the core and the surface.

8. The armrest of claim 1 wherein the material comprises at least one of (a) a mixture of polyurethane, (b) a combination of a reaction mixture, (c) foam material, (d) polyurethane foam, (e) urethane foam, (f) injection-molded material, (g) injected foam material, (h) plastic, (i) resin.

9. The armrest of claim 1 wherein the surface is formed as a skin on the core.

10. The armrest of claim 1 wherein the material comprises at least one of (a) a foam material, (b) a urethane foam, (c) a compressible foam.

11. The armrest of claim 1 wherein the base comprises a cushion formed on the substrate from an injection-molded material.

12. The armrest of claim 11 wherein the injection-molded material forms the core.

13. The armrest of claim 1 wherein the base is formed to at least partially entrap the substrate.

14. The armrest of claim 1 wherein the collapsible substrate is configured for attachment to a door panel and wherein the core is configured to deform under at least one of (a) an impact load, (b) a side impact load, (c) a collision impact.

15. An armrest for a vehicle comprising:
a substrate having a top portion and a side portion;
a base providing a reinforcement formed over the substrate and providing a lateral support for the top portion of the substrate; and
a cover over the base;
wherein the base is formed of a material that forms an integral skin on a core; and
wherein the base comprises a unitary member.

16. The armrest of claim 15 wherein the unitary member formed from the material is configured to provide the core comprising a density and the integral skin comprising a density; and wherein the density of the integral skin is higher than the density of the core.

17. The armrest of claim 15 wherein the material comprises at least one of (a) a mixture of polyurethane, (b) a combination of a reaction mixture, (c) foam material, (d) polyurethane foam, (e) urethane foam, (f) injection-molded material, (g) injected foam material, (h) plastic, (i) resin.

18. The armrest of claim 15 wherein the base is overmolded onto at least one of (a) the top portion of the substrate, (b) the side portion of the substrate.

19. The armrest of claim 15 wherein the armrest substrate includes an attachment feature for a frame of a vehicle door and wherein the armrest substrate is configured to provide a plurality of crumple portions.

20. An armrest for a vehicle interior comprising:
a substrate; and
a base spanning over a gap in the substrate;
wherein the base is formed from a material and comprises a core and a surface;
wherein a density of the material of the surface is greater than a density of the material of the core; and
wherein the material comprises at least one of (a) a mixture of polyurethane, (b) a combination of a reaction mixture, (c) foam material, (d) polyurethane foam, (e) urethane foam, (f) injection-molded material, (g) injected foam material, (h) plastic, (i) resin.

21. An armrest for a vehicle comprising:
(a) a laterally collapsible substrate providing at least one gap defined between an inner portion and an outer portion of the substrate; and
(b) a base formed on the collapsible substrate configured to facilitate deflection or deformation of the inner portion of the substrate relative to the outer portion of the substrate to deflect in response to lateral load on the collapsible substrate;

wherein the base is formed of a material;
wherein the base comprises a core comprised of core material and a surface formed on the core comprised of surface material; and
wherein the surface is formed as a skin on the core.

* * * * *